US009986691B2

(12) United States Patent
Verhaeghe et al.

(10) Patent No.: US 9,986,691 B2
(45) Date of Patent: Jun. 5, 2018

(54) SQUARE BALERS

(71) Applicant: CNH Industrial America LLC, New Holland, PA (US)

(72) Inventors: Didier O. M. Verhaeghe, Ypres (BE); Tom Coen, Zemst (BE)

(73) Assignee: CNH Industrial America LLC, New Holland, PA (US)

( * ) Notice: Subject to any disclaimer, the term of this patent is extended or adjusted under 35 U.S.C. 154(b) by 464 days.

(21) Appl. No.: 14/767,787

(22) PCT Filed: Feb. 10, 2014

(86) PCT No.: PCT/EP2014/052531
§ 371 (c)(1),
(2) Date: Aug. 13, 2015

(87) PCT Pub. No.: WO2014/124896
PCT Pub. Date: Aug. 21, 2014

(65) Prior Publication Data
US 2015/0373919 A1 Dec. 31, 2015

(30) Foreign Application Priority Data
Feb. 14, 2013 (BE) .................................. 2013/0099

(51) Int. Cl.
*A01F 15/08* (2006.01)
*A01F 15/10* (2006.01)

(52) U.S. Cl.
CPC ...... *A01F 15/0825* (2013.01); *A01F 15/0841* (2013.01); *A01F 15/10* (2013.01)

(58) Field of Classification Search
CPC .............. A01F 15/0825; A01F 15/0858; A01F 15/0841; A01F 15/0844; A01F 15/044; A01F 15/08; A01F 15/145; A01F 15/10; A01F 2015/102; A01F 2015/0866; G01B 21/06
USPC ........................... 100/179, 189; 56/341, 443
See application file for complete search history.

(56) References Cited

U.S. PATENT DOCUMENTS

| 4,611,535 A | 9/1986 | Anstey et al. |
| 5,913,801 A | 6/1999 | Bottinger et al. |
| 5,979,153 A | 11/1999 | Roth |
| 6,012,271 A | 1/2000 | Wilkens et al. |
| 6,050,074 A | 4/2000 | Clostermeyer |
| 7,252,587 B2 | 8/2007 | Viaud |
| 7,331,168 B2 | 2/2008 | Dubois |
| 7,415,365 B2 | 8/2008 | Jeppe |
| 8,200,399 B2 | 6/2012 | Madsen |

(Continued)

FOREIGN PATENT DOCUMENTS

FR 2783130 A1 3/2000

*Primary Examiner* — Jimmy T Nguyen
(74) *Attorney, Agent, or Firm* — Peter K. Zacharias; Patrick M. Sheldrake

(57) ABSTRACT

A square baler having a baling chamber, a plunger reciprocable at one end of the baling chamber, a pre-compression chamber where charges of crop are amassed and pre-compressed by a rotor prior to transfer into the baling chamber. A transducer is provided for producing an electrical output signal indicative of the load on the rotor and a processing circuit is operative to estimate the rate of crop flow into the pre-compression chamber by analyzing the output signal of the transducer over a complete filling and emptying cycle of the pre-compression chamber.

9 Claims, 3 Drawing Sheets

(56) References Cited

U.S. PATENT DOCUMENTS

| | | | |
|---|---|---|---|
| 2001/0042362 A1 | 11/2001 | Scarlett et al. | |
| 2002/0011061 A1* | 1/2002 | Lucand | A01D 90/04 |
| | | | 56/341 |
| 2005/0198936 A1* | 9/2005 | Viaud | A01D 90/04 |
| | | | 56/341 |
| 2005/0235841 A1 | 10/2005 | Hel | |
| 2008/0028738 A1* | 2/2008 | Viaud | A01F 15/106 |
| | | | 56/341 |
| 2011/0191001 A1 | 8/2011 | Viaud | |
| 2014/0021018 A1* | 1/2014 | Biziorek | A01F 15/106 |
| | | | 198/722 |

* cited by examiner

SQUARE BALERS

This application is the US National Stage filing of International Application Serial No. PCT/EP2014/052531 filed on Feb. 10, 2014 which claims priority to Belgian Application BE2013/0099 filed Feb. 14, 2013, each of which is incorporated herein by reference in its entirety.

FIELD OF THE INVENTION

The present invention relates to a square baler and is concerned with controlling the operation of the baler to produce well formed bales of uniform density.

BACKGROUND OF THE INVENTION

In a square baler, crop is picked up from the ground by means of a rotary pickup having radially projecting tines. The crop picked up from the ground is advanced towards a rotor arranged at the lower end of an arcuate chute. The rotor serves to compress the crop into the arcuate chute, the latter acting as a pre-compression chamber.

When a plunger reciprocating in a baling chamber of the baler is at the bottom dead centre position of its reciprocating cycle, a stuffer displaces the crop present in the pre-compression chamber into the baling chamber, the crop becoming a slice of the bale in the process of being formed. Once the bale in the baling chamber has reached a certain size, twine is wrapped around the bale and knotted to form a finished bale. The finished bale remains in the baling chamber while the next bale is being formed and is eventually discharged from the rear end of the baler.

As square balers are well known and documented, it is believed that the above brief description will suffice for an understanding of the present invention.

In order to produce well formed bales of uniform density, it is desirable to ensure that the density of the crop in the pre-compression chamber is at a desired level when a stuffer cycle is initiated. The stuffer cycle must of course be synchronised with the movement of the plunger of the baling chamber and can only take place at the end of a whole number of cycles of the plunger in the baling chamber.

If, for example, a stuffer cycle is performed every three cycles of the plunger in the baling chamber, it would be undesirable for the crop density in the pre-compression chamber to reach the desired level either after two and half plunger cycles or three and half plunger cycles. In the former case, the crop density would be too great by the time the crop is transferred to the baling chamber. In the latter case, if a stuffer cycle is initiated by a pressure sensor in the pre-compression chamber, the stuffer cycle could be delayed by a complete plunger cycle.

OBJECT OF THE INVENTION

It is therefore desirable to be able to estimate crop flow rate into the pre-compression chamber in order to be able to ensure that the crop density attains a desired level at the time that it is transferred into the baling chamber.

SUMMARY OF THE INVENTION

According to the present invention, there is provided a square baler, comprising a baling chamber, a plunger reciprocable at one end of the baling chamber, a pre-compression chamber within which charges of crop are amassed and pre-compressed by a rotor prior to transfer into the baling chamber, and a pickup roller having radially projecting tines for picking up crop from the ground and advancing the crop to the rotor, characterised by a transducer for producing an electrical output signal indicative of the load on the rotor and a processing circuit operative to estimate the rate of crop flow into the chute by analysing the output signal of the transducer over a complete filling and emptying cycle of the pre-compression chamber.

In the case of forage harvesters and combine harvesters, it has been previously proposed to use the load on various parts of the crop transport mechanism, to indicate the rate of flow. However, in such agricultural machines, the measured load does not undergo cyclic variation. By contrast, in a square baler, the load on the rotor varies during a complete filling and emptying cycle of the pre-compression chamber. At the commencement of a cycle, the pre-compression chamber is empty and little resistance is encountered in advancing the crop received from the pickup roller into it. Initially, the crop will not reach the opposite end of the chamber but will remain near the rotor. For more crop to be introduced into the pre-compression chamber, the crop already in the pre-compression chamber needs to be moved along towards the opposite end and this results in the rotor meeting progressively increased resistance. Once the pre-compression chamber is full, the rotor meets still further increased resistance as it attempts to compress the crop. Finally, on initiation of the stuffer cycle, the load on the rotor drops as the opening between the pre-compression chamber and the baling chamber is uncovered while the stuffer empties the pre-compression chamber by transferring its contents into the baling chamber.

Despite the fluctuating nature of the output signal of the load measuring transducer, it has been found that by analysis of the waveform over a complete cycle, it is possible to estimate the crop flow rate entering the pre-compression chamber.

A first parameter of the output signal that has been found to be related to the crop flow rate is the value of the peak load on the rotor.

Though this value varies with the rate of crop flow, it does not allow for other drag forces acting on the rotor. For this reason, the difference between the maximum and minimum of the measured output signal has been found to be a more useful parameter.

A further parameter that may be used is the average rate of increase of the measured load during the time that the pre-compression chamber is being filled.

The rate at which crop is picked up will vary with the density of the crop on the ground and with the speed of travel of the baler. If the crop is sparse, then the baler can be moved faster to achieve the desired flow rate to reach the desired crop density in the pre-compression chamber just as the plunger of the baling chamber reaches it bottom dead centre position. The reading from the crop flow sensor may therefore be used to provide the operator with advice on when to increase or decrease the speed of the baler.

In addition to using the crop flow rate to set a recommended baler speed, it may be used to vary the volume of the pre-compression chamber. The pre-compression chamber may have a movable wall to vary its volume and this provides a correction parameter that has a faster reaction time than the speed of the baler. If the crop flow rate is likely to result in excessive crop density in the pre-compression chamber, then its size may be increased relatively rapidly to ensure that a uniform crop density is admitted into the baling chamber in each cycle, even though the mass of the crop may vary between slices.

In order to measure the load on the rotor, the load sensing transducer may be responsive to the tension in a chain driving the rotor.

A sprocket may be mounted in engagement with a run of the drive chain and the transducer may serve to measure the force acting to displace the sprocket in a direction perpendicular with the run of the chain.

Alternatively, the transducer may take the form of a torque measuring load cell mounted on the axle of the rotor.

BRIEF DESCRIPTION OF THE DRAWINGS

The invention will now be described further, by way of example, with reference to the accompanying drawings, in which.

DETAILED DESCRIPTION OF THE EMBODIMENTS

Figure 1:
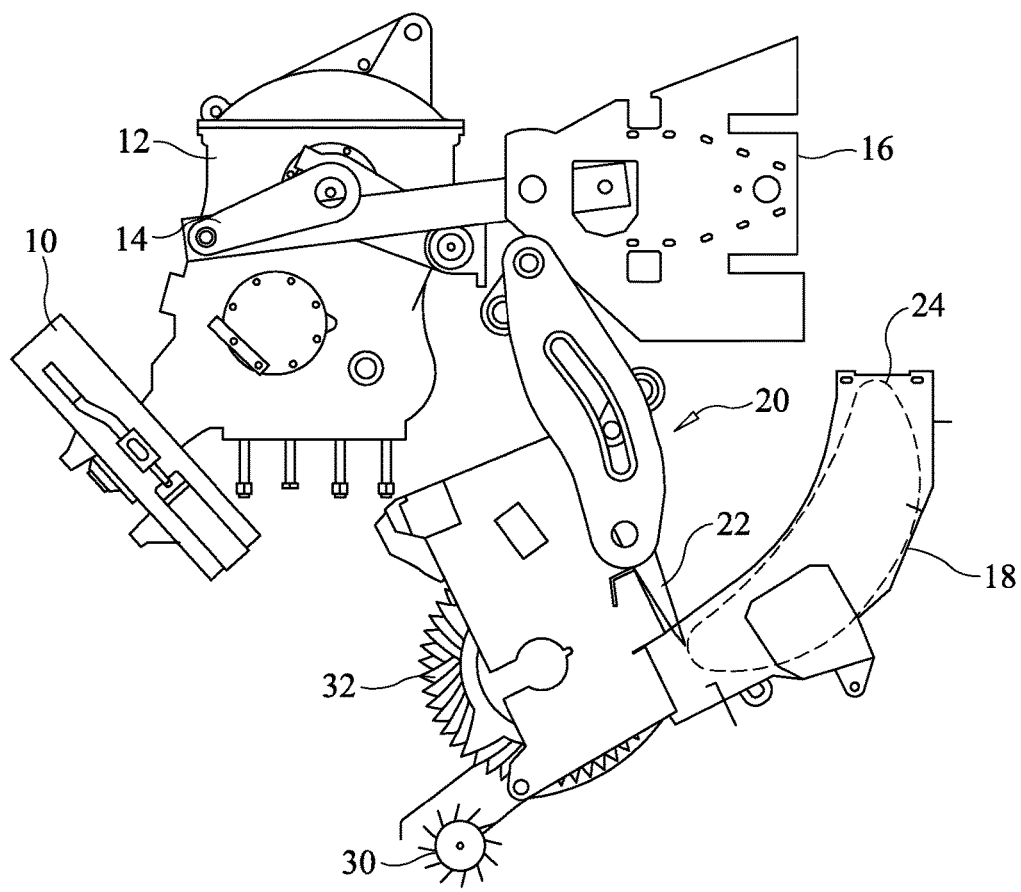
FIG. 1 is a schematic representation of the moving parts of a square baler.

FIG. 1 shows a flywheel 10 that is connected by an input shaft to the power takeoff shaft of a tractor (not shown). The flywheel drives a gearbox 12 that serves to rotate a crank arm 14 to cause reciprocating movement of a plunger 16. The plunger 16 reciprocates within a baling chamber (not shown) to compress slices of crop that are introduced into the baling chamber by means of a pre-compression chamber 18. The transfer of crop from the pre-compression chamber 18 to the baling chamber is effected by a stuffer mechanism 20, also driven by the gearbox 12, the end of a stuffer arm 22 following a kidney shaped path represented by a dotted line 24 in FIG. 1. As so far described, all the components are conventional and are operated in a conventional manner.

The present invention is concerned only with ensuring that the crop amassed in the pre-compression chamber 18 has a desired density at the commencement of a stuffer cycle. In order to achieve this objective, it is necessary to measure the flow rate of crop into the pre-compression chamber 18.

The crop is introduced into the pre-compression chamber by a pickup roller 30 that has radially projecting tines. Crop picked up from the ground by the tines is advanced towards a powered rotor 32 that may serve as a chopper but the primary function of which is to compress the crop into the pre-compression chamber 18.

Figure 2:
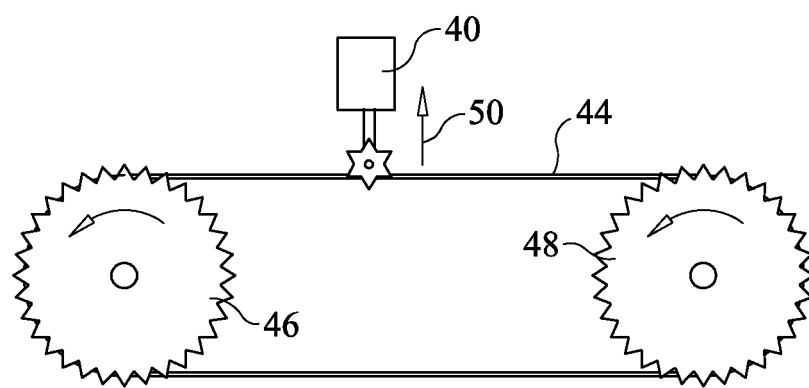
FIG. 2 shows a transducer for measuring the tension in a chain driving the rotor, to determined the load on the rotor.

In order to measure the flow rate, a transducer is provided to determine the load on the rotor 32. Such a transducer could take the form of a load cell built into the axis of the rotor 32 to measure the torque applied by its drive sprocket but to avoid modification to the axle it is possible to use a transducer as shown in FIG. 2. In FIG. 2, a transducer 40 is connected to a an idler sprocket 42 acting on a run of a chain 44 serving to transmit torque from a sprocket 46 driven by the gearbox 12 to a drive sprocket 48 of the rotor 32. As the load on the rotor 32 increases, the tension in the chain 44 increases and applies a force in the direction of the arrow 50 which is measured by the transducer. The transducer may be a load cell or it may measure the compression spring (not shown) urging the idler sprocket 42 in a direction to maintain the tautness of the chain.

Figure 3:
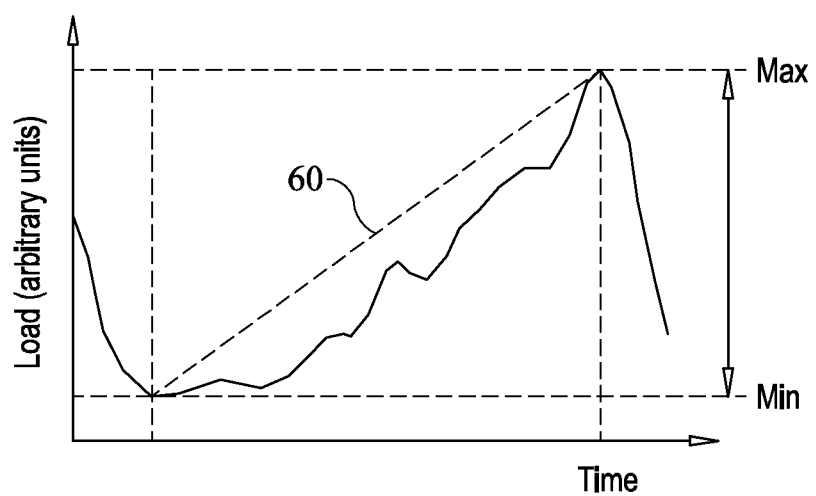
FIG. 3 is a graph showing the variation in the output signal of the load sensing transducer during a filling and emptying cycle of the pre-compression chamber.

During the course of a filling and emptying cycle of the pre-compression chamber 18, the output signal of the transducer will vary in the manner shown schematically in FIG. 3. Essentially, the resistance to rotation of the rotor is at a minimum at the commencement of a cycle when filling begins, and increases to a maximum once the pre-compression chamber is full and its contents are being compressed. The resistance then drops as the pre-compression chamber is emptied by the stuffer 20 transferring its contents to the baling chamber while the plunger is near the bottom dead centre position of its stroke.

In the present invention, the mean crop flow rate is determined from analysis of the waveform in FIG. 3. One of the parameters that varies with the flow rate is the maximum value. Assuming that a stuffer cycle occurs after a predetermined number of plunger cycles, then the density of the crop at the time of the transfer into the baling chamber will clearly depend on the crop flow and this affect the maximum load on the rotor.

The maximum value will however also be affected by other loads acting on the rotor, for example friction and to eliminate the effect of such other factors on the estimated crop flow rate, it is preferred to rely on the difference between the minimum and maximum load on the rotor 32.

A parameter still more closely indicative of the crop flow rate is the average rate of increase in the load while the pre-compression chamber is being filled, that is to say the slope of the line designated 60 in FIG. 3. This gradient not only takes into account the difference between the minimum and maximum values of the resistive load on the rotor 32 but also the time it takes to fill the pre-compression chamber. It is possible for example to achieve the same difference and maximum load while actuating the stuffer mechanism once every three cycles of the plunger or once during every four cycle of the plunger. Clearly, however, the crop flow rate will be higher if it takes only three cycles of the plunger to fill the pre-compression chamber to the desired density.

Figure 4:
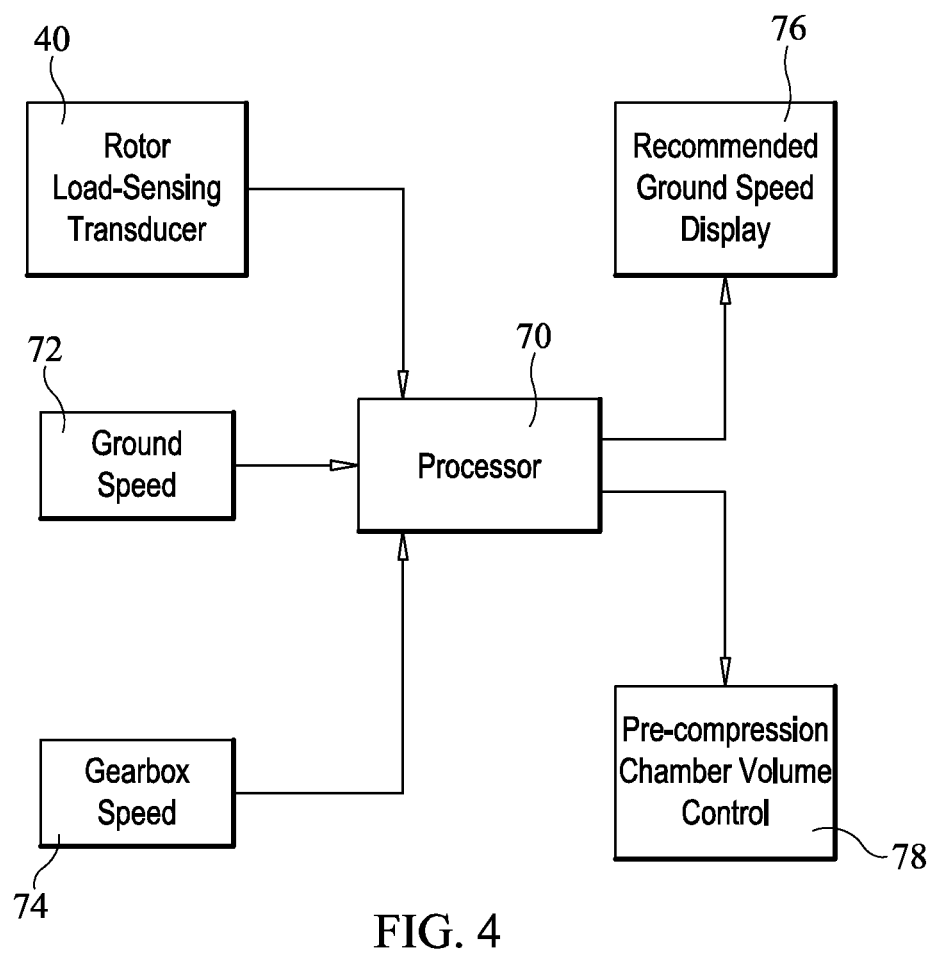
FIG. 4 is a schematic diagram of circuitry for analysing the output of the rotor load sending transducer in FIG. 2.

In FIG. 4, the output of the load cell 40 is supplied to a digital processor 70 that is suitably programmed and connected additionally to receive signals from a ground speed sensor 72 and gearbox speed sensor 74. The gearbox speed signal is used to determined the duration of the reciprocation cycle of the plunger 16.

The time that it should take for the pre-compression chamber to be filled with crop up to a density within a desired range should coincide with a whole number multiple of the time it takes for the plunger 16 to perform a complete cycle of reciprocation. This is because a stuffer cycle can only be performed when the plunger 16 is at its bottom dead centre position, in which position the plunger 16 uncovers an opening that connects the pre-compression chamber 18 to the baling chamber. From a knowledge of the duration of the reciprocation cycle of the plunger 16, the processor 70 can determine whether the crop pickup rate needs to be increased or decreased to achieve a crop density within a desired range at the correct time.

The rate at which crop is picked up from the ground is of course dependent upon the speed at which the baler has driven over the ground. In an embodiment of the invention, the processor 70 can provide advice to the operator of the baler through a display screen 76 to increase or decrease the ground speed in order to improve the quality of the finished bales.

Such speed control of the baler does not have a very rapid response, as the operator cannot be expected to accelerate or brake sharply to vary the crop density in the pre-compression chamber. It is therefore alternatively possible to vary the volume of the pre-compression chamber 18 to achieve slices of different thickness but of the desired density. It is known that the pre-compression chamber may have a movable wall and in the embodiment of the invention shown in FIG. 4 such a movable wall is positioned by means of closed loop control circuit 78 to maintain a desired density, the volume of the pre-compression chamber being increased when the density is estimated to be too high and decreased when the predicted density is estimated to be too low.

The invention claimed is:

1. A square baler, comprising:
   a baling chamber;
   a plunger reciprocable at one end of the baling chamber;
   a pre-compression chamber within which crop is pre-compressed by a rotor prior to transfer into the baling chamber; and
   a transducer for producing an electrical output signal indicative of a load on the rotor and a processing circuit operative to estimate a rate of crop flow into the pre-compression chamber by analyzing the output signal of the transducer over a complete filling and emptying cycle of the pre-compression chamber,
   wherein, in order to estimate the crop flow rate, the processing circuit is configured to analyze the output signal of the transducer to determine a maximum load on the rotor during a filling and emptying cycle of the pre-compression chamber.

2. The square baler as claimed in claim 1, wherein in order to estimate the crop flow rate, the processor is operative to analyze the output signal of the load sensing transducer to determine the difference between the maximum load and a minimum load on the rotor during a filling and emptying cycle of the pre-compression chamber.

3. The square baler as claimed in claim 1, wherein in order to estimate the crop flow rate, the processor is operative to analyze the output signal of the load sensing transducer to determine the maximum load and a minimum load on the rotor during a filling and emptying cycle of the pre-compression chamber and to determine the average rate of increase of the load over time as the load increases from the minimum to the maximum value.

4. The square baler as claimed in claim 1, wherein the transducer is operative to measure the tension of a chain driving the rotor.

5. The square baler as claimed in claim 1, wherein the processing circuit is connected to a display unit for displaying to an operator a recommended ground speed.

6. The square baler as claimed in claim 1, wherein the processing unit is connected to a control circuit configured to vary a volume of the pre-compression chamber.

7. A method of estimating the rate at which crop is picked up from the ground by a square baler that comprises a baling chamber, a plunger reciprocable at one end of the baling chamber, a precompression chamber within which charges of crop are amassed and precompressed by a rotor prior to transfer into the baling chamber, the method comprising the steps of:
   measuring a load on the rotor by a transducer and producing an output signal indicative of the load on the rotor;
   analyzing the output signal with a processing circuit over a complete filling and emptying cycle of the pre-compression chamber and determining a parameter of the output signal of the transducer that is indicative of the rate of crop flow into the pre-compression chamber; and
   determining a maximum load on the rotor during a filling and emptying cycle of the pre-compression chamber.

8. The method as claimed in claim 7, wherein the processor determines the difference between the maximum load and a minimum load on the rotor during a filling and emptying cycle of the pre-compression chamber.

9. A method as claimed in claim 7, wherein the processor determines the maximum load and a minimum load on the rotor during a filling and emptying cycle of the pre-compression chamber and determines the average rate of increase of the load over time as the load increases from the minimum to the maximum value.

\* \* \* \* \*